United States Patent
Niu (10) Patent No.: US 8,826,496 B2
(45) Date of Patent: Sep. 9, 2014

(54) ELASTIC HINGE OF QUICK-ASSEMBLY LEG

(75) Inventor: Shouye Niu, Shenzhen (CN)

(73) Assignee: Elegance Optical Mfy. Limited, Shenzhen (CN)

( * ) Notice: Subject to any disclaimer, the term of this patent is extended or adjusted under 35 U.S.C. 154(b) by 0 days.

(21) Appl. No.: 13/697,771

(22) PCT Filed: Aug. 4, 2011

(86) PCT No.: PCT/CN2011/078038
§ 371 (c)(1),
(2), (4) Date: Nov. 13, 2012

(87) PCT Pub. No.: WO2013/016874
PCT Pub. Date: Feb. 7, 2013

(65) Prior Publication Data
US 2013/0232726 A1    Sep. 12, 2013

(51) Int. Cl.
*G02C 5/22*    (2006.01)
*G02C 5/14*    (2006.01)
*E05D 5/02*    (2006.01)

(52) U.S. Cl.
CPC *E05D 5/02* (2013.01); *G02C 5/146* (2013.01); *G02C 5/2236* (2013.01)
USPC .......................................................... 16/228

(58) Field of Classification Search
CPC .............. E05D 5/02; E05D 7/10; E05D 5/023; E05D 7/0238; G02C 5/2218; G02C 5/2236; G02C 5/22; G02C 5/2227; G02C 5/14; G02C 5/16

USPC ............ 16/228, 229, 262, 263, 268; 351/113, 351/114, 111, 121, 153, 118, 119
See application file for complete search history.

(56) References Cited

U.S. PATENT DOCUMENTS

| | | | | |
|---|---|---|---|---|
| 4,991,258 | A | * | 2/1991 | Drlik .............................. 16/228 |
| 5,400,090 | A | * | 3/1995 | Chen ............................. 351/113 |
| 5,657,107 | A | * | 8/1997 | Wagner et al. ................ 351/113 |
| 6,241,354 | B1 | * | 6/2001 | Schuchard et al. ........... 351/113 |
| 6,353,965 | B1 | * | 3/2002 | Lo .................................. 16/228 |
| 6,547,389 | B2 | * | 4/2003 | Hotellier ...................... 351/153 |
| 7,357,271 | B2 | * | 4/2008 | Hase et al. ................. 220/592.2 |
| 7,798,637 | B2 | * | 9/2010 | Medana ........................ 351/113 |
| 7,874,042 | B2 | * | 1/2011 | Buchegger ...................... 16/228 |
| 2001/0038436 | A1 | * | 11/2001 | Schuchard et al. ........... 351/113 |
| 2003/0172492 | A1 | * | 9/2003 | Schuchard ...................... 16/228 |
| 2004/0237258 | A1 | * | 12/2004 | Montagner ...................... 16/228 |
| 2008/0192199 | A1 | * | 8/2008 | Hotellier ...................... 351/153 |

FOREIGN PATENT DOCUMENTS

FR     2665268 A1 *  1/1992
WO  WO 2007107474 A1 *  9/2007

* cited by examiner

*Primary Examiner* — Chuck Mah (57) ABSTRACT

The present invention directs an elastic hinge for quick-assembly leg including: a double-tooth of hinge, a screw, a spring core assembly and a leg; wherein the spring core assembly includes a elastic buckle, a single-tooth frame which is inserted in cavity of the elastic buckle, a core pin sleeved in a cavity of the elastic buckle which is formed after the single-tooth is assembled into the elastic buckle, and a spring sleeved on the core pin; the elastic buckle is provided with a fastening part and a leg is formed with locking part to engaged with the fastening part, and the removable part of the leg and the elastic hinge are assembled together.

12 Claims, 9 Drawing Sheets

ELASTIC HINGE OF QUICK-ASSEMBLY LEG

CROSS-REFERENCES TO RELATED APPLICATIONS

This application is a U.S. National Phase application under 35 U.S.C 371 of PCT/CN2011/078038 filed Aug. 4, 2011, which is incorporated by reference in its entirety for all purposes.

FIELD OF THE INVENTION

The present invention relates to an elastic hinge for quick-assembly leg.

BACKGROUND OF THE INVENTION

The former quick-assembly leg mostly uses the elastic buckle into the hollow leg, and then the leg can be pulled out after press the elastic buckle. Typically, such as Chinese patent CN201145783Y, this glasses structure can only achieve the leg-changed without the function of elastic hinge.

Chinese patent CN200720172754.0 discloses a quick-disassembly glasses frame, which is aim to provide a glasses frame can be disassembled without the tools. The technical solution comprises a mounting head, a leg, a elastic plate and lamellate hinge, said elastic plate includes an square-hole-like elastic moving part and an elastic fastening part. On end of the lamellate hinge is arranged to be a square hole matched the elastic moving part, and a cut is arranged on the end of the square hole. The lamellate hinge is inserted inside the elastic moving part via the cut and can be rotated along the elastic moving part, and then the lamellate hinge and the elastic moving part are coordinated to form a space to arrange a spring. Another end of the lamellate hinge is arranged to be a ring-shape hinge joint which is matched and connected to the hook arranged on the mounting head. A through groove is arranged on the leg, and an opening is arranged on the leg with through groove, a cut is arranged on the leg which is set the through groove thereon. After the fastening of the elastic plate is inserted to the through groove of the leg, the elastic fastening part is connected to the said opening. It is a great progress that a function of the elastic hinge is presented in this technical proposal. But the elastic plate in this glasses frame comprises the elastic moving part and the elastic fastening part, the elastic fastening part and the elastic moving part are tandem arranged, whose structure seems loose and non-compact; the feature of the configured connection of this hinge and hook provided on the mounting head is too restrictive, which may cause the arc of leg closing up and hook opening to affect the appearance and it is hard to get a better locking effect; the plane of hook is vertical intersected with the plane of hinge, which makes the connecting method of the mounting head and leg via the screw cannot put into use, and the application scope and form of this quick-disassembly glasses frame are narrow and simple.

SUMMARY OF THE INVENTION

The object of present invention is to provide a compact structural, easy processed various forms and widely used elastic hinge for quick-assembly leg without tools.

The technical solution of the present invention is the elastic hinge for the quick-assembly leg, including a double-tooth of hinge, a screw, a spring core assembly and a leg; which characterized that the spring core assembly includes a elastic buckle, a single-tooth frame which is inserted in cavity of the elastic buckle, a core pin sleeved in a cavity of the elastic buckle which is formed after the single-tooth is assembled into the elastic buckle, and a spring sleeved on the core pin; the elastic buckle is provided with a fastening part and a leg is formed with locking part to engaged with the fastening part, and the removable part of the leg and the elastic hinge are assembled together.

Preferably, the single-tooth frame comprises two mutually perpendicular flat sheets whose structure are mutually perpendicular which are forepart and backpart, with the forepart being approximate to circular shape, and a circular through-hole being formed thereon, the backpart which is mutually perpendicular with this forepart is approximate to rectangle shape, and a rectangle through-hole is provided thereon, a non-through groove is formed along the centre line from outside to inside at the end of backpart; the forepart of single-tooth frame is actively connected to the double-tooth of the hinge via screw, the non-through groove at the backpart of the single-tooth frame is inserted into the slot formed at the corresponding part of the elastic buckle to be positioned, the rectangle through-hole is configured to contain the core pin and the spring sleeved on the core pin, the undersurface of the rectangle through-hole is configured to be against the undersurface of the spring and locking the hinge.

Preferably, the single-tooth frame is a flat sheet whose structure is in the same plane, its appearance of forepart is approximate to circular, and a circular through-hole is formed thereon, its appearance of backpart is approximate to rectangle, and a rectangle through-hole is provided thereon, a non-through groove is opened along the centre line from outside to inside at the end of backpart; the forepart of single-tooth frame is actively connected to the double-tooth of the hinge via screw, the groove at the backpart of the single-tooth frame is inserted into the slot formed at the corresponding part of the elastic buckle to be positioned, the rectangle through-hole is configured to contain the core pin and the spring sleeved on the core pin, the undersurface of the rectangle through-hole is configured to be against the undersurface of the spring and locking the hinge.

Preferably, the elastic buckle includes a first elastic plate, a second elastic plate which is parallel to the first elastic plate, a backpart which is collected together and shaped as a uni-body from the first elastic plate and second elastic plate, the cavity formed between the first elastic plate and the second elastic plate, a slot opened along the centre line at the backpart of the cavity of the elastic buckle, which is configured for the groove of the single-tooth frame to be inserted thereto and being communicated with the cavity, a cantilever vertically protruded from the second elastic plate towards the opening of the cavity, being inserted in the rectangle through-hole of the single-tooth frame for positioning the core pin, a fastening part, which is protruded outward from the first elastic plate near its opening end, and a L-type male fastener molded by the end of the fastening part, being resisted against a female fastener of opening end of leg housing.

Preferably, the elastic buckle includes a first elastic plate, a second elastic plate which is parallel to the first elastic plate, a backpart which is collected together and shaped as a uni-body from the first elastic plate and second elastic plate, a slot opened along the centre line at the backpart of the cavity of the elastic buckle, which is configured for the groove of the single-tooth frame and cut through with the cavity, a cantilever vertically protruded from the second elastic plate towards the opening of the cavity, being inserted in the rectangle through-hole of the single-tooth frame for positioning the core pin, a first and a second fastening part, which is protruded from the first and second elastic plate outwards near their opening ends respectively and symmetrically, a first L-type male fastener which is resisted against a first female fastener provided on the end of the first fastening part of the first opening of the leg housing, and a second L-type male fastener which is resisted against a second female fastener provided on the end of the second fastening part of the second opening of the leg housing.

Preferably, a cross inner-cavity is formed inside the end of the leg from outside to inside, and formed by the intersection of a horizontal flat hole and a vertical flat hole, a fastening part is formed by one side of one of the flat holes cut through with a small section of the inner side of the leg, the locking part is latch on the fastening part of the elastic buckle, an L-type female fastener which is provided for the male fastener of the elastic buckle to abut on is formed by a side of the fastening part and two sides at the top of closed flat hole.

Preferably, a non-through crossed inner cavity is set at one end of the leg from outside to inside, and formed by the intersection of a horizontal flat hole and a vertical flat hole, two sides of one of the flat hole are respectively cut through with a small section of up and down side of the leg, a length of opening is respectively formed on each up and down side of the leg, that is a locking part of the leg, the locking part is specially served for containing two fastening parts of the elastic buckle, two L-type female fasteners which are provided for male fasteners of the elastic buckle to abut on are formed by the side of the two openings and two sides at the top of closed flat hole.

Preferably, the core pin includes two cylinders whose head parts are stumpy, the pin parts are slim.

Compare to the prior art, the advantages of present invention as following:

1. Under the condition of without increasing the length of the elastic buckle, using the cantilever to combine the elastic buckle and the single-tooth frame satisfying both the containing of spring and the function of buckle, which is configured to be a structure compact.

2. The design whose 90 degree angle between the plane of the hinge hole of single-tooth frame and the plane of rectangle frame which contains the spring, and the single-tooth plane is perpendicular to the inner/outer face of the leg, thereby the hinge can achieve the connection of single/double tooth (plate) and screw.

3. Using a concept of the single-tooth and double-tooth screwed connection, which is convenient for the application in various kinds of glasses.

4. Using single buckle which increase the various ways to disassemble the leg, such as pinching the elastic buckle at up-down sides of the leg, inside or outside of the leg.

5. Using the core pin which can disassemble the hinge of the leg has reliable locking when stirring outward, and making the spring is not use in the solid condition.

DETAILED DESCRIPTION OF ILLUSTRATED EMBODIMENTS

Various preferred embodiments of the invention will now be described with reference to the figures, wherein like reference numerals designate similar parts throughout the various views.

FIG. 1 to FIG. 10 are shown the first embodiment of the present invention.

Figure 1:
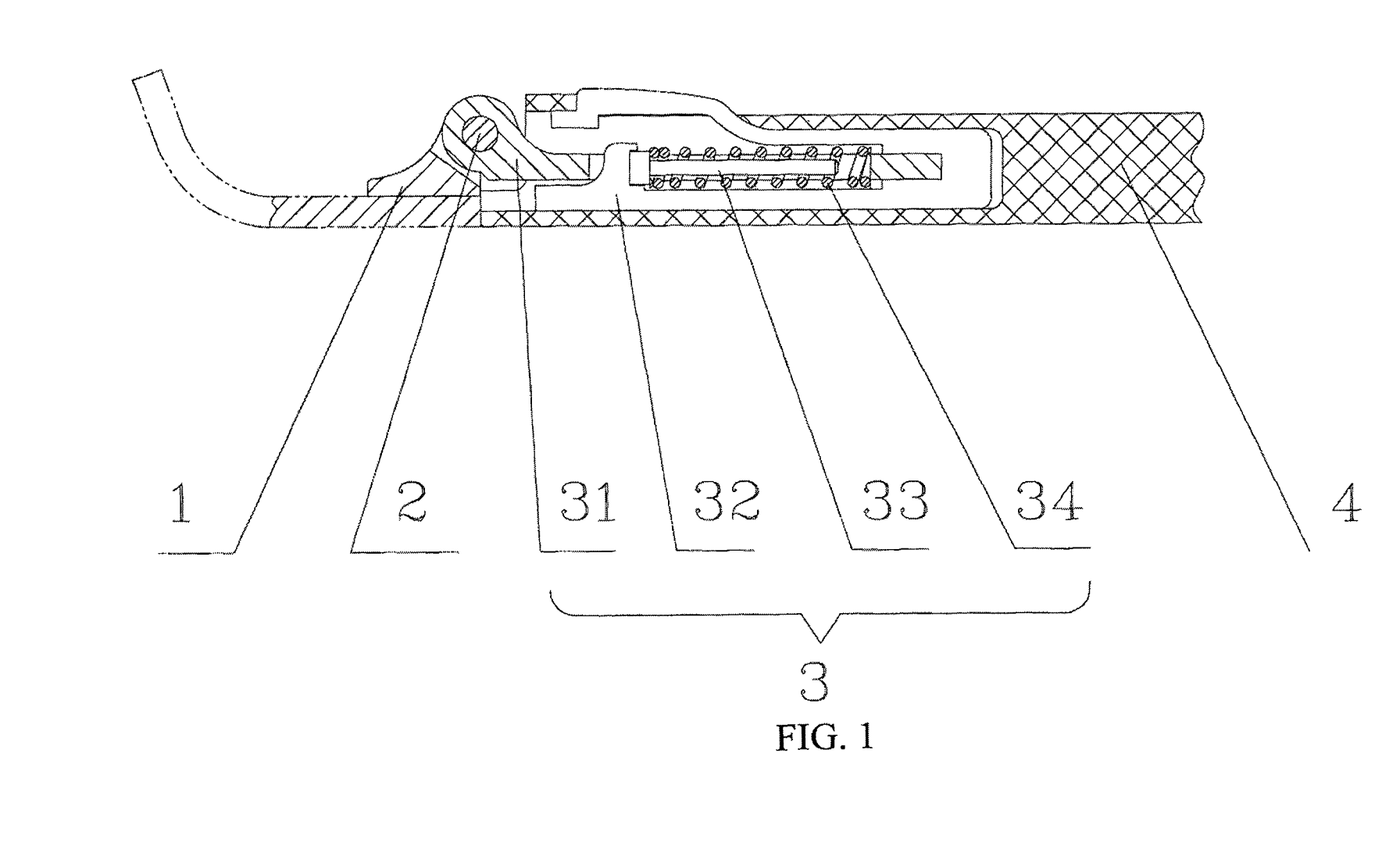
FIG. 1 is a sectional schematic view of the elastic hinge in accordance with a first embodiment of the present invention.

Regarding to FIG. 1, the elastic hinge for the quick-assembly leg, including a double-tooth of hinge 1, a screw 2, a spring core assembly 3 and a leg 4; wherein the spring core assembly 3 includes a elastic buckle 32, a single-tooth frame 31 which is inserted in cavity of the elastic buckle, a core pin 33 sleeved in a cavity of the elastic buckle 32 which is formed after the single-tooth frame 31 is assembled into the elastic buckle 32, and a spring 34 sleeved on the core pin 33; the elastic buckle 32 is provided with a fastening part and a leg 4 is formed with locking part to engaged with the fastening part, and the removable part of the leg and the elastic hinge are assembled together.

Figure 2:
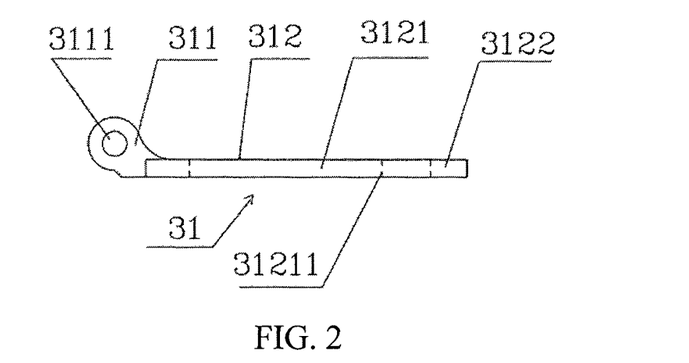
FIG. 2 is a structural main view of the single-tooth frame in accordance with the first embodiment of the present invention.
Figure 3:
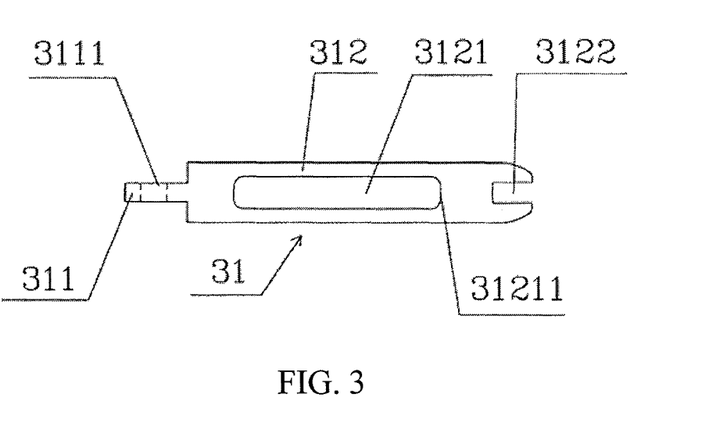
FIG. 3 is a structural top view of the single-tooth frame in accordance with the first embodiment of the present invention.

Regarding to FIGS. 2 and 3, the single-tooth frame 31 includes two mutually perpendicular flat sheets whose structure are mutually perpendicular which are forepart 311 and backpart 312, with the forepart 3111 being approximate to circular shape, and a circular through-hole 3121 being formed thereon, the backpart 312 which is mutually perpendicular with this forepart 311 is approximate to rectangle shape, and a rectangle through-hole 3121 is provided thereon, a non-through groove 3122 is formed along the centre line from outside to inside at the end of backpart 312; the forepart 311 of single-tooth frame is actively connected to the double-tooth of the hinge 1 via screw 2, the non-through groove 3122 at the backpart 312 of the single-tooth frame 31 is inserted into a slot 3241 formed at the corresponding part of the elastic buckle 32 to be positioned, the rectangle through-hole 3121 is configured to contain the core pin 33 and the spring 34 sleeved on the core pin 33, the undersurface 31211 of the rectangle through-hole is configured to be against the undersurface of the spring 34 and locking the hinge.

Figure 4:
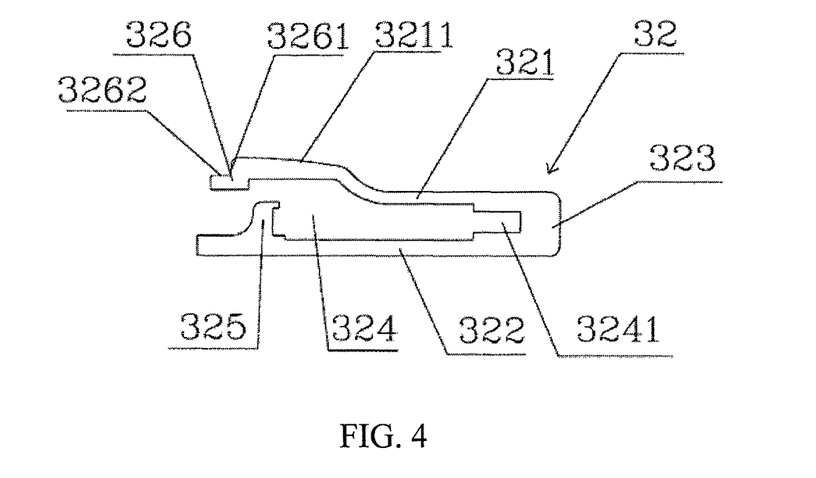
FIG. 4 is a structural schematic view of the elastic buckle in accordance with the first embodiment of the present invention.

Regarding to FIG. 4, the elastic buckle 32 includes a first elastic plate 321, a second elastic plate 322 which is parallel to the first elastic plate, a backpart 323 which is collected together and shaped as a unibody from the first elastic plate 321 and second elastic plate 322, the cavity 324 formed between the first elastic plate 321 and the second elastic plate 322, a slot 3241 opened along the centre line at the backpart of the cavity 324 of the elastic buckle, which is configured for the groove 3122 of the single-tooth frame 31 to be inserted thereto and being communicated with the cavity 324, a cantilever 325 vertically protruded from the second elastic plate 322 towards the opening of the cavity 324, being inserted in the rectangle through-hole 3121 of the single-tooth frame 31 for positioning the core pin 33, a fastening part 3211 which is protruded outward from the first elastic plate 321 near its opening end, and a L-type male fastener 326 molded by a topsurface 3261 and vertical part 3262 of the side head of the fastening part 3211.

Figures 5, 6:
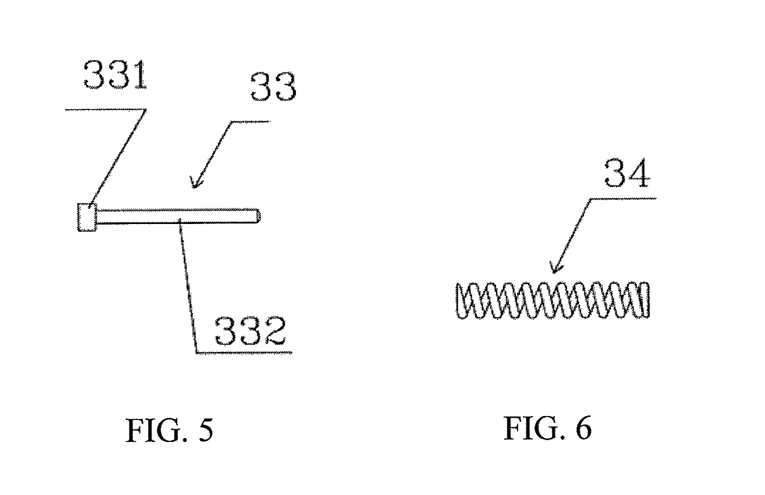
FIG. 5 is a structural schematic view of the core pin of the present invention.
FIG. 6 is a schematic view of a spring of the present invention.

Regarding to FIG. 5, the core pin 33 includes two cylinders which the head part is stumpy, the pin part is slim.

Regarding to FIG. 6, the spring 34 is an ordinary coil spring.

Figure 7:
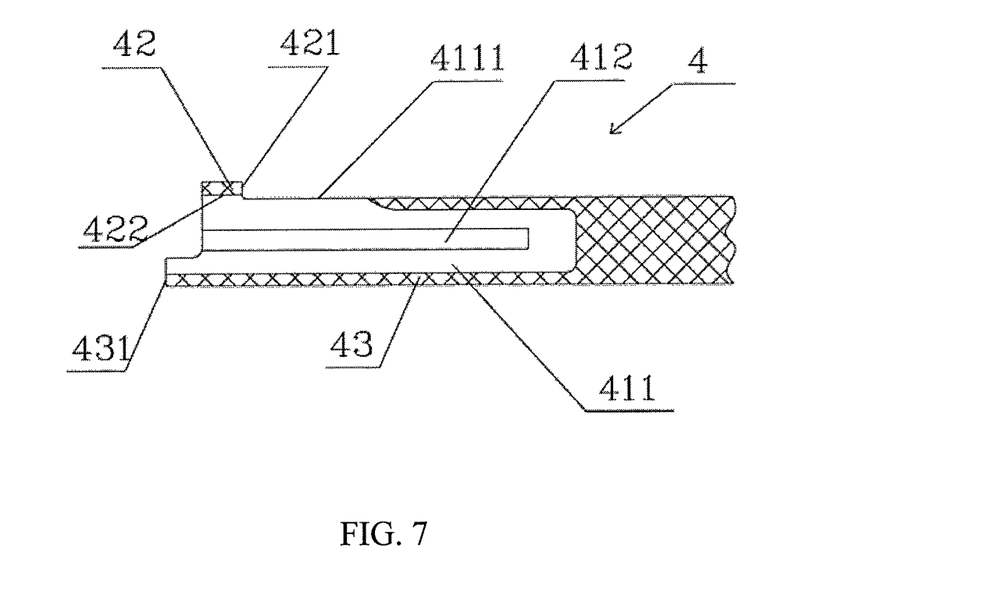
FIG. 7 is a structural schematic view of the leg in accordance with the first embodiment of the present invention.
Figure 8:
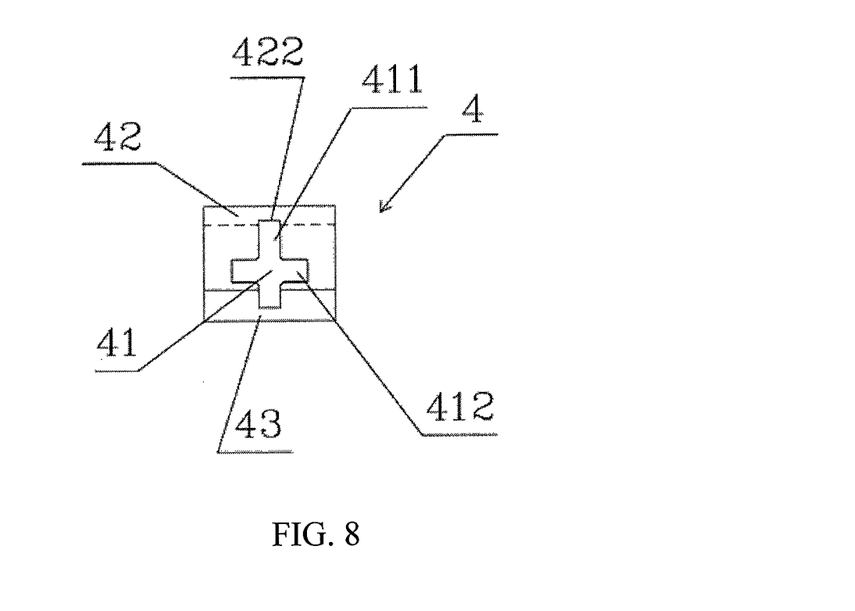
FIG. 8 is a schematic left view of FIG. 7.
Figure 9:
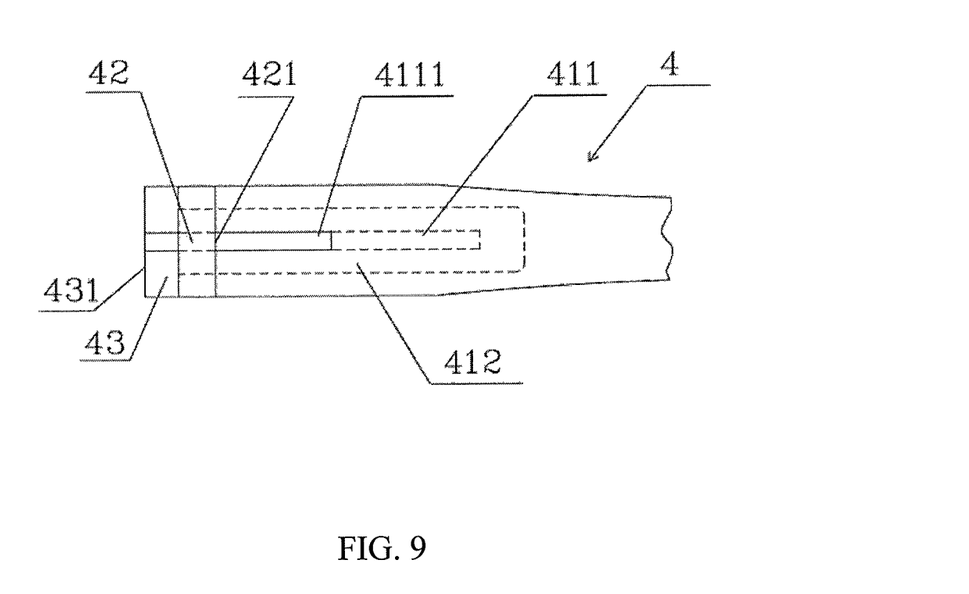
FIG. 9 is a schematic top view of FIG. 7.

Regarding to FIG. 7-FIG. 9, a cross inner-cavity 41 is formed inside the end of the leg 4 from outside to inside, and formed by the intersection of a vertical flat hole 411 and a horizontal flat hole 412. Wherein the vertical flat hole 411 is provided for the inserting of the elastic buckle 32, the horizontal flat hole 412 is provided for the inserting of the single-tooth frame 31, and the intersection of the two flat holes is provided for inserting of the core pin 33 and spring 34. The vertical flat hole 411 is cut through the outer surface of the leg 4 to form a flat opening 4111 (that is a fastening part of the leg 4) which is located not far away from the top side of the leg housing. On the occasion, the topsurface 3261 of the elastic buckle 32 is resisted against a first short plane 421 of the leg 4, and the vertical part 3262 of the elastic buckle 32 is abut on a second short plane 422. An L-type female fastener 42 is formed by the first short plane 421 and the second short plane 422 of the leg 4.

In the other embodiments, the elastic buckle 32 also is not arrange a vertical part 3262, when the leg 4 is stirred outward, the elastic buckle 32 will not stretch outward, which is relied on the curve adapted to the leg housing to constrain the elastic plate 321, thereby to guarantee the topsurface 3261 of the elastic buckle 32 is abut on the first short plane 421 of the leg 4, and will not break away from its fastener.

For the easy installation in the production process, as commonly, the single-tooth frame 31, elastic buckle 32, core pin 33 and spring 34 are assembled to the spring core assembly 3.

The assembly of the spring core assembly 3 is regarded to FIG. 1, the single-tooth frame 31 within the plane positioned state as shown in FIG. 2, which is inserted inside the cavity 324 of the elastic buckle 32 from the open place. The backpart groove 3122 of the single-tooth frame 31 through the rectangle slot 3241 of the elastic buckle 32 downward, and then inserted actively with the elastic buckle 32. The core pin 33 and the spring 34 are arranged into the cavity which is formed from combination of the single-tooth frame 31 and the elastic buckle 32, the lower end of the spring 34 is resisted against the bottom edge 31211 of the rectangle hole of the single-tooth frame 31. The pin 332 of the core pin is inserted in the hole of the spring 34, and the lower part of the head 331 of core pin is resisted against the spring 34, the upper part is resisted against the cantilever 325 of the elastic buckle 32, than the assembly of spring core assembly 3 is completed.

Installing the spring core pin assembly 3 into the leg 4: screw connecting the double-tooth of the hinge welded on the mounting head 5 and the single-tooth frame 31 of the spring core pin assembly via the screw 2, then the head 5 is pinched, which the spring core pin 3 is inserted inside the leg 4 through the cross cavity 41 of the leg. The elastic buckle is shrunk when inserting, then the protruded outward elastic fastening part 3211 of the elastic buckle 32 and the flat opening 4111 of the leg 4 will abut on adaptively after the spring core pin is put in place. The male fastener 326 of the elastic buckle 32 and the female fastener 42 are relied on each other, and the leg 4 can be assembly connected with the hinge.

Figure 10:
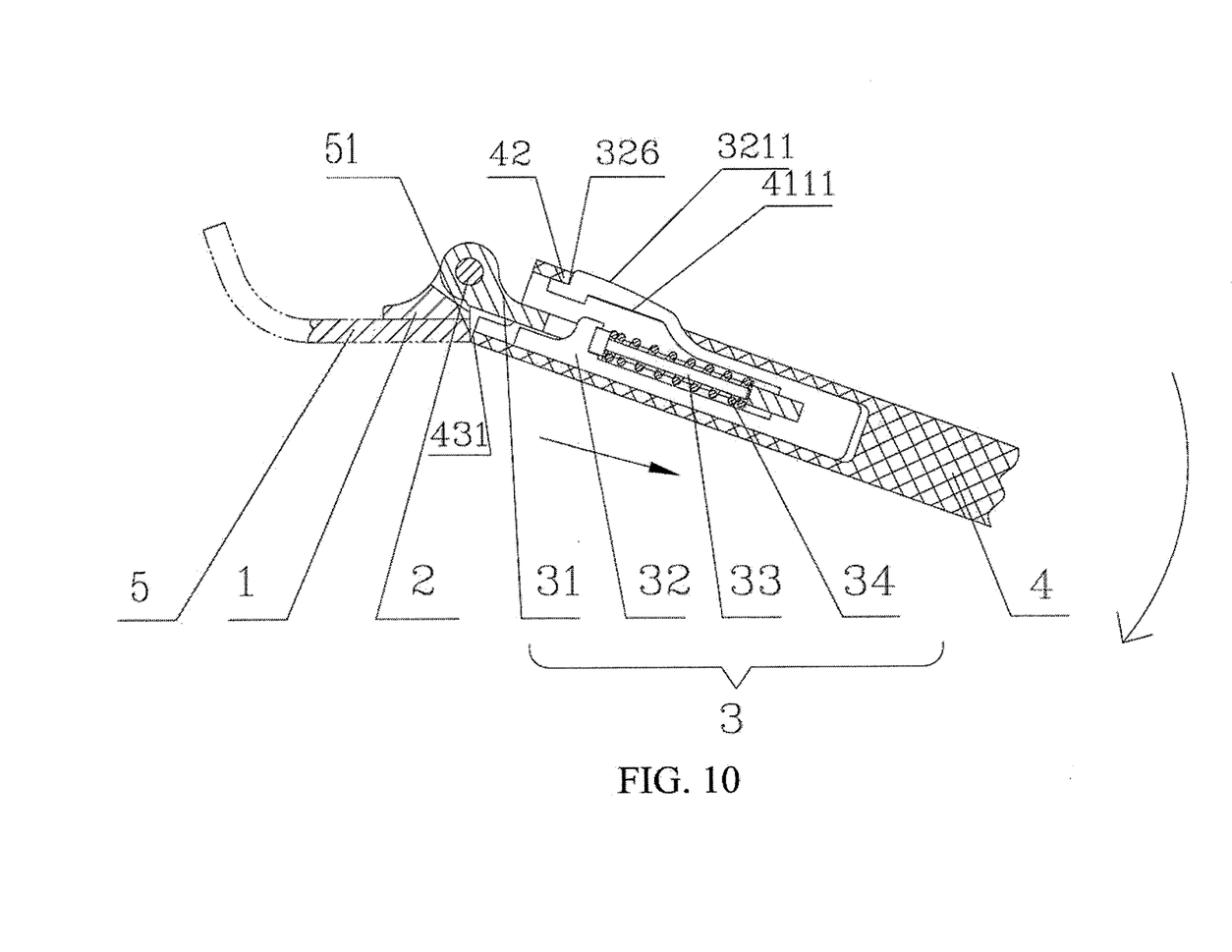
FIG. 10 is a schematic moving view of stirring the internal structures of the leg in accordance with the first embodiment of the present invention.

Regarding to FIG. 10, the leg 4 is stirred outward, and the single-tooth frame can only rotate the axis of the screw 2 at this moment, which cannot move outward. The platform 431 at the long edge 43 of the leg 4 is tightly resisted against the down surface 51 of the mounting head 5. The fastening part 3211 of the elastic buckle 32 is fastened with the opening 4111 of the leg 4 via the male fastener 326 and the first female fastener 42, which results in the leg 4 and elastic buckle 32 can only be conjoined and moved toward the direction of arrow shown in figure. At the same time, the cantilever 325 of the elastic buckle 32 pushes the head 331 of the core pin 33 to press the spring 34 until the end of core pin 33 is abutted on the bottom edge 31211 of the rectangle through-hole, thereby the leg 4 will stop to swing outward. In this process, it can feel the elastic power of the leg 4, and the leg 4 will stop to rotate outward at a certain angle (that is locking). When disassembling the leg 4, it only needs to use the thumb and forefinger pinching and pressing the fastening part 3211 which is appeared on the elastic buckle 32, and then the elastic buckle 32 will be shrunk, the male fastener 326 of the elastic buckle 32 will be break away from the female fastener 24 of leg 4, the mounting head 5 is pulled by another hand, then the leg 4 will be disassembled.

FIG. 11 to FIG. 17 are shown the second embodiment of the present invention.

Figure 11:
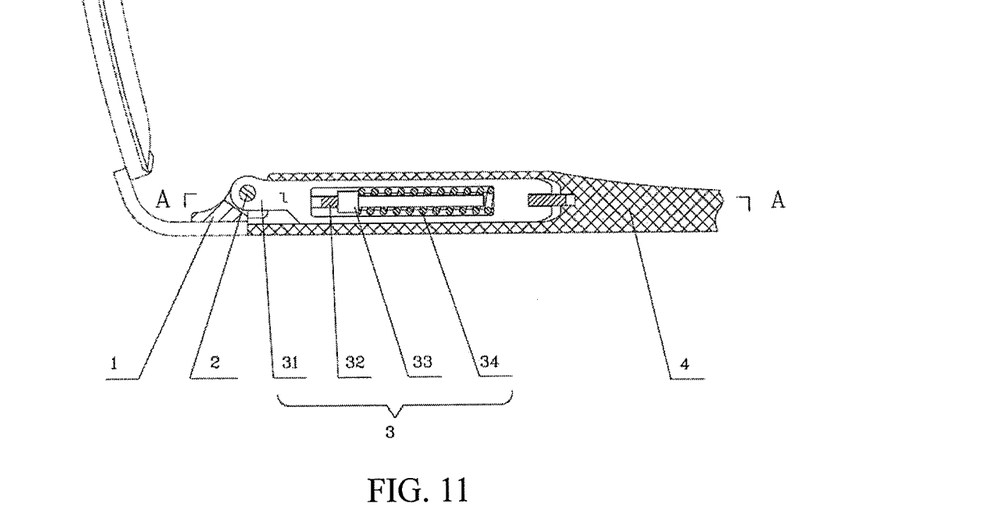
FIG. 11 is a sectional schematic view of the elastic hinge in accordance with the second embodiment of the present invention.
Figure 12:
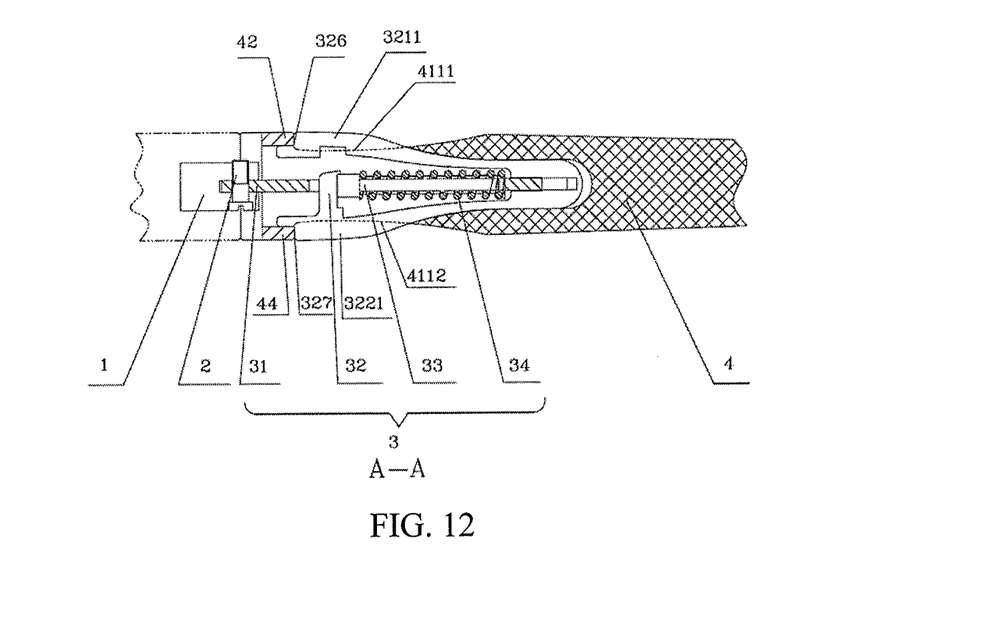
FIG. 12 is an A-A direction sectional view of FIG. 11.

Regarding to FIGS. 11 and 12, the elastic hinge for the quick-assembly leg including: a double-tooth 1 of the hinge, a screw 2, a spring core pin assembly 3 and a leg 4; wherein the spring core pin assembly 3 includes a single-tooth frame 31, an elastic buckle 32, a core pin 33 and a spring 34. The double-tooth secured to a mounting head 5 is pin-jointed with the single-tooth frame 31 of the spring core pin assembly 3 via the screw 2, and an elastic hinge for quick-assembly glasses leg is formed by the spring core pin assembly 3 inserting and fastening to the leg 4 which is arranged a cavity. Different from the unidirectional elastic buckle of the first embodiment, the elastic buckle in the figure is a bi-directional elastic buckle, which is fastened with the leg 4 at the two sides of the leg 4.

Figure 13:
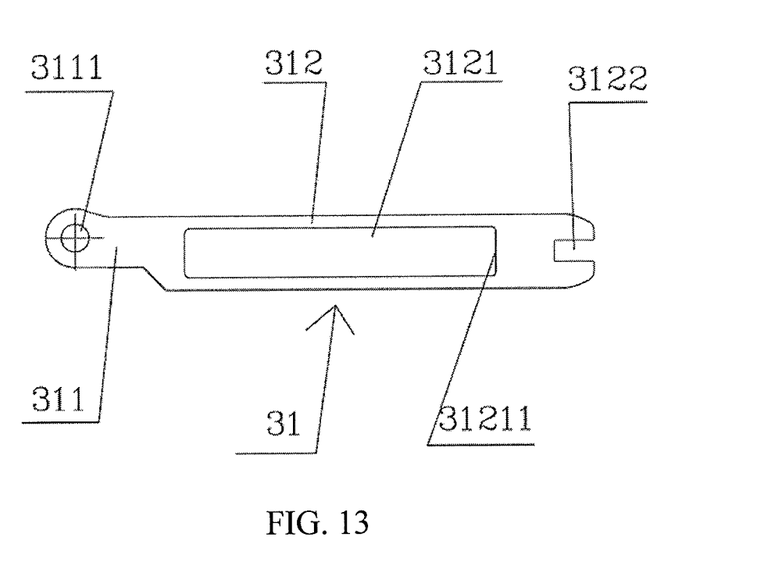
FIG. 13 is a schematic view of the single-tooth frame in accordance with the second embodiment of the present invention.

Regarding to FIG. 13, the single-tooth frame 31 is a flat sheet, whose all structure elements are in the same plane, which is different with the first embodiment. Its appearance of forepart 311 is approximate to circular, and a circular through-hole 3111 is formed thereon, its appearance of backpart 312 is approximate to rectangle, and a rectangle through-hole 3121 is provided thereon, a non-through groove 3122 is opened along the centre line from outside to inside at the end of backpart 312; the forepart 311 of single-tooth frame 31 is actively connected to the double-tooth 1 of the hinge via the screw 2, the groove 3122 at the backpart 312 of the single-tooth frame 31 is inserted into the slot 3241 formed at the corresponding part of the elastic buckle 32 to be positioned, the rectangle through-hole 3121 is configured to contain the core pin 33 and the spring 34 sleeved on the core pin 33, the undersurface 31211 of the rectangle through-hole 3121 is configured to be against the undersurface of the spring 34 and locking the hinge.

Figure 14:
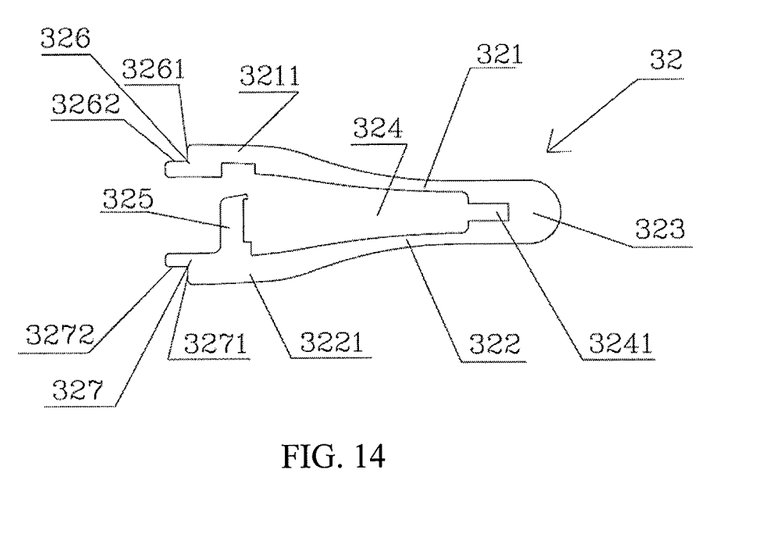
FIG. 14 is a schematic view of the bi-directional elastic buckle in accordance with the second embodiment of the present invention.

Regarding to FIG. 14, the elastic buckle 32 includes: a first elastic plate 321, a second elastic plate 322 which is parallel to the first elastic plate, a backpart 323 which is collected together and shaped as a unibody from the first elastic plate and second elastic plate, the cavity 324 formed between the first elastic plate and the second elastic plate, a slot 3241 opened along the centre line at the backpart of the cavity 324 of the elastic buckle, which is configured for the groove 3122 of the single-tooth frame 31 and cut through with the cavity 324, a cantilever 325 vertically protruded from the second elastic plate 322 towards the opening of the cavity 324, being inserted in the rectangle through-hole 3121 of the single-tooth frame 31 for positioning the core pin 33, a first fastening part 3211 and a second fastening part 3221, which is protruded from the first 321 and second elastic plate 322 outwards near their opening ends respectively and symmetrically, a first L-type male fastener 326 which is resisted against a first female fastener 42 provided on the end of the first fastening part 3211 of the first opening 4111 of the leg 4 housing, and a second L-type male fastener 327 which is resisted against a second female fastener 44 provided on the end of the second fastening part 3221 of the second opening 4112 of the leg 4 housing. The elastic buckle 32 is entirely arranged in the cavity of leg 4, and formed a detachable connection with the leg 4 via the first fastening part 3211 and the second fastening part 3221; when the first fastening part 3211 of the elastic buckle 32 is resisted against in the first opening 4111 which corresponding to the housing of the leg 4, and the first L-type male fastener 326 of the elastic buckle 32 is also resisted against on the first female fastener 42 at the side of the first opening 4111 which corresponding to the housing of the leg 4; when the second fastening part 3221 of the elastic buckle 32 is resisted against in the second opening 4112 which corresponding to the leg housing, the second L-type male fastener 327 of the elastic buckle 32 is also resisted against on the second female fastener 44 at the side of the second opening 4112 which corresponding to the housing of the leg 4.

Figure 15:
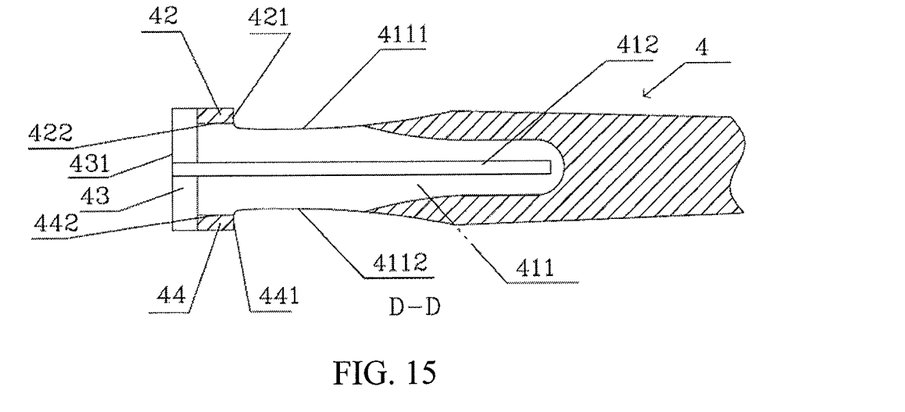
FIG. 15 is a structure sectional schematic view of the leg in accordance with the second embodiment of the present invention.
Figure 16:
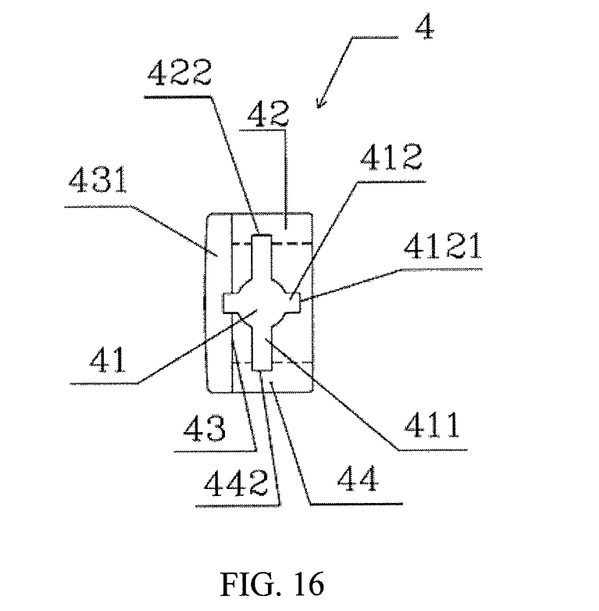
FIG. 16 is a schematic left view of FIG. 15.
Figure 17:
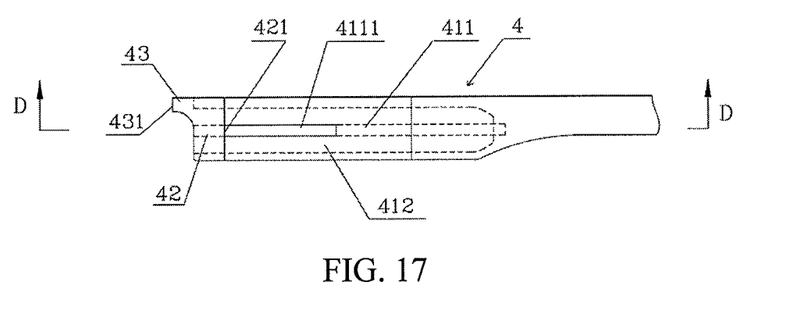
FIG. 17 is a schematic top view of FIG. 15.

Regarding to FIG. 15 to FIG. 17, a cross inner-cavity 41 is formed inside the end of the leg 4 from outside to inside, and formed by the intersection of a horizontal flat hole 412 and a vertical flat hole 411. Wherein the vertical flat hole 411 is provided for the inserting of the elastic buckle 32, the horizontal flat hole 412 is provided for the inserting of the single-tooth frame 31, and the intersection of the two flat holes is provided for inserting of the core pin 33 and spring 34. The vertical flat hole 411 is cut through the up-down outer surface of the leg 4 to form a first flat opening 4111 and a second flat opening 4112 (which respectively are a first fastening part 3211 and a second fastening part 3221) which are symmetrically. The opening 4111 and 4112 are adapted to provide the first fastening part 3211 and the second fastening part 3221 of the elastic buckle 32 are fastened thereon. On the occasion, the first topsurface 3261 and the second topsurface 3271 of the elastic buckle 32 are respectively against the first short plane 421 and the third short plane 441 of the leg 4, and a first vertical part 3262 and a second vertical part 3272 are respectively abutted the second short plane 422 and the forth short plane 442 of the leg. The first short plane 421 and the second short plane 422 of the leg are molded to be the first female fastener 42 of the leg hereon, and the third short plane 411 and the fourth short plane 442 are molded to be the second female fastener 44 of the leg 4.

In the other embodiments, the elastic buckle 32 also cannot be arrange a first vertical part 3262 and a second vertical part 3272, when the leg 4 is stirred outward, the elastic buckle 32 will not stretch outward, which is relied on the curve adapted to the housing of leg to constrain the elastic plate 321 and the elastic plate 322, thereby to guarantee the first topsurface 3261 and the second topsurface 3271 of the elastic buckle 32 is resisted against the first short plane 421 and the third short plane 441 of the leg 4, thereby will not break away from its fastener.

For the easy installation in the production process, as commonly, the single-tooth frame 31, elastic buckle 32, core pin 33 and spring 34 are assembled to the spring core assembly 3.

The assembly of the spring core assembly 3 is regarding to FIG. 11: the single-tooth frame 31 is needed to rotate 90 degree within symmetric line from the position shown in FIG. 13, which is inserted inside the cavity 324 of the elastic buckle 32 from the open place. The backpart groove 3122 of the single-tooth frame 31 through the rectangle slot 3241 of the elastic buckle 32 downward, and then inserted actively with the elastic buckle 32. The core pin 33 and the spring 34 are arranged into the cavity which is formed from combination of the single-tooth frame 31 and the elastic buckle 32, the lower end of the spring 34 is resisted against the bottom edge 31211 of the rectangle hole of the single-tooth frame 31. The pin 332 of the core pin is inserted in the hole of the spring 34, and the lower part of the head 331 of core pin is resisted against the spring 34, the upper part is resisted against the cantilever 325 of the elastic buckle 32, than the assembly of spring core assembly 3 is completed.

Regarding to FIG. 12, the first fastening part 3211 and the second fastening part 3221 of this elastic buckle 32 are appeared on two sides of the housing of leg 4. The double-tooth of the hinge welded on the mounting head 5 and the single-tooth frame 31 in the spring core pin assembly 3 are screw connected, then the mounting head 5 is pinched, which the spring core pin 3 is inserted inside the leg 4 through the cross cavity 41 of the leg. The elastic buckle is shrunk when inserting, then the protruded outward elastic fastening part 3211 of the elastic buckle 32 and the flat opening 4111 of the leg 4 will abut on adaptively after the spring core pin is put in place. The male fastener 326 of the elastic buckle 32 and the female fastener 42 are relied on each other, thereby the leg 4 can be detachable connected with the hinge.

Figure 18:
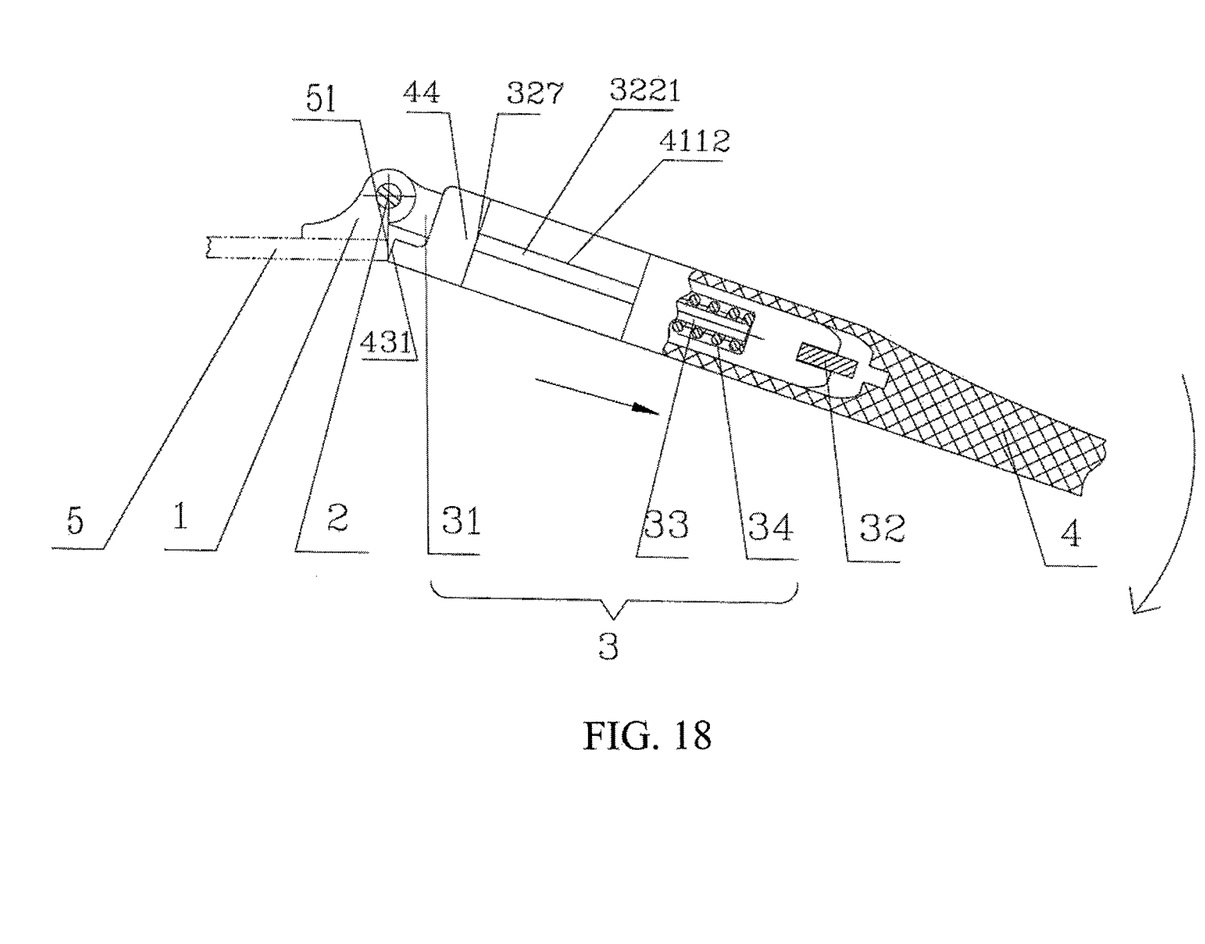
FIG. 18 is a schematic moving view of stirring the internal structures of the leg in accordance with the second embodiment of the present invention.

Regarding to FIG. 18, the leg 4 is stirred outward, and the single-tooth frame 31 can only rotate the axis of the screw 2 at this moment, which cannot move outward. The platform 431 at the long edge 43 of the leg 4 is tightly resisted against the down surface 51 of the mounting head 5. The first fastening part 3211 and the second fastening part 3221 of the elastic buckle 32 are respectively fastened with the first flat opening 4111 and the second flat opening 4112 of the leg 4 via the first male fastener 326, the second male fastener 327, the first female fastener 42 and the second female fastener 44, which results in the leg 4 and elastic buckle 32 can only be conjoined and moved toward the direction of arrow shown in figure. At the same time, the cantilever 325 of the elastic buckle 32 pushes the head 331 of the core pin 33 to press the spring 34 until the end of core pin 33 is abutted on the bottom edge 31211 of the rectangle through-hole, thereby the leg 4 will stop to swing outward. In this process, it can feel the elastic power of the leg 4, and the leg 4 will stop to rotate outward at a certain angle (that is locking). When disassembling the leg 4, it only needs to use the thumb and forefinger pinching and pressing the first fastening part 3211 and second fastening part 3221 which are appeared on the elastic buckle 32, and then the elastic buckle 32 will be shrunk, the first male fastener 326 and the second fastener 327 of the elastic buckle 32 will be break away from the first female fastener 24 and the second female fastener 44 of leg 4, the mounting head 5 is pulled by another hand, then the leg 4 will be disassembled.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. An elastic hinge for quick-assembly leg comprising:
   a double-tooth hinge portion;
   a screw;
   a spring core assembly; and
   a leg;
   wherein the spring core assembly comprise an elastic buckle, a single-tooth frame which is inserted in a cavity of the elastic buckle, a core pin which is housed in a cavity of the elastic buckle after the single-tooth frame is assembled into the elastic buckle, and a spring sleeved on the core pin; the elastic buckle is provided with a fastening part and the leg is formed with a locking part to engaged with the fastening part, and the leg and the elastic hinge are removably assembled together;
   the single-tooth frame comprises a forepart and a backpart, the forepart is approximate to circular, and a circular through-hole is formed thereon, the backpart is approximate to rectangle and a rectangle through-hole is provided thereon, a non-through groove is opened along the centre line from outside to inside at the end of backpart; the forepart of the single-tooth frame is connected to the double-tooth hinge portion via said screw, the groove at the backpart of the single-tooth frame is inserted into a slot formed at the corresponding part of the elastic buckle to be positioned, the rectangle through-hole is configured to contain the core pin and the spring sleeved on the core pin, the undersurface of the rectangle through-hole is configured to be against the undersurface of the spring and stop the movement of the hinge.

2. The elastic hinge for quick-assembly leg according to claim 1, wherein the single-tooth frame comprises two mutually perpendicular flat sheets whose structure are mutually perpendicular which are forepart and backpart.

3. The elastic hinge for quick-assembly leg according to claim 2, wherein a cross inner-cavity is formed inside the end of the leg from outside to inside, and formed by the intersection of a horizontal flat hole and a vertical flat hole, a locking part is formed by one side of one of the flat holes cut through with a small section of the inner side of the leg, the locking part is latched on the fastening part of the elastic buckle, an L-type female fastener which is provided for a male fastener of the elastic buckle to abut on is formed on a side of the fastening part.

4. The elastic hinge for quick-assembly leg according to claim 1, wherein the single-tooth frame is a flat sheet whose structure is in the same plane.

5. The elastic hinge for quick-assembly leg according to claim 4, wherein a non-through crossed inner cavity is set at one end of the leg from outside to inside, and formed by the intersection of a horizontal flat hole and a vertical flat hole, two sides of one of the flat hole are respectively cut through with a small section of up and down side of the leg, a-opening is respectively formed on each up and down side of the leg, that is a locking part of the leg, the locking part is specially served for containing two fastening parts of the elastic buckle, two L-type female fasteners which are provided for male fasteners of the elastic buckle to abut on are formed by sides of two openings.

6. The elastic hinge for quick-assembly leg according to claim 1, wherein the elastic buckle comprises:
   a first elastic plate;
   a second elastic plate which is parallel to the first elastic plate;
   a backpart which is collected together and shaped as a unibody from the first elastic plate and second elastic plate;
   the cavity formed between the first elastic plate and the second elastic plate;
   a slot opened along the centre line at the backpart of the cavity of the elastic buckle, which is configured for a groove of the single-tooth frame to be inserted thereto and being communicated with the cavity;
   a cantilever vertically protruded from the second elastic plate towards an opening of the cavity, being inserted in the rectangle through-hole of the single-tooth frame for positioning the core pin;
   the fastening part, which is protruded outward from the first elastic plate; and
   a L-type male fastener molded by the end of the fastening part, being resisted against a female fastener of opening end of leg housing.

7. The elastic hinge for quick-assembly leg according to claim 6, wherein a cross inner-cavity is formed inside the end of the leg from outside to inside, and formed by the intersection of a horizontal flat hole and a vertical flat hole, a locking part is formed by one side of one of the flat holes cut through with a small section of the inner side of the leg, the locking part is latched on the fastening part of the elastic buckle, an L-type female fastener which is provided for a male fastener of the elastic buckle to abut on is formed on a side of the fastening part.

8. The elastic hinge for quick-assembly leg according to claim 1, wherein the elastic buckle comprises:
   a first elastic plate;
   a second elastic plate;
   a backpart which is collected together and shaped as a unibody from the first elastic plate and second elastic plate;
   a slot opened along the centre line at the backpart of the cavity of the elastic buckle, which is configured for a groove of the single-tooth frame and cut through with the cavity;
   a cantilever vertically protruded from the second elastic plate towards a opening of the cavity, being inserted in the rectangle through-hole of the single-tooth frame for positioning the core pin;
   the fastening part having a first fastening part and a second fastening part, which is are protruded from the first elastic plate and the second elastic plate respectively and symmetrically; and
   the locking part having a first L-type male fastener and a second L-type male fastener, with the first L-type male fastener being resisted against a first female fastener provided on the end of the first fastening part of the first opening of the leg housing,
   the second L-type male fastener being resisted against a second female fastener provided on the end of the second fastening part of the second opening of the leg housing.

9. The elastic hinge for quick-assembly leg according to claim 8, wherein a non-through crossed inner cavity is set at one end of the leg from outside to inside, and formed by the intersection of a horizontal flat hole and a vertical flat hole, two sides of one of the flat hole are respectively cut through with a small section of up and down side of the leg, a-opening is respectively formed on each up and down side of the leg, that is a locking part of the leg, the locking part is specially served for containing two fastening parts of the elastic buckle, two L-type female fasteners which are provided for male fasteners of the elastic buckle to abut on are formed by sides of two openings.

10. The elastic hinge for quick-assembly leg according to claim 1, wherein a cross inner-cavity is formed inside the end of the leg from outside to inside, and formed by the intersection of a horizontal flat hole and a vertical flat hole, a locking part is formed by one side of one of the flat holes cut through with a small section of the inner side of the leg, the locking part is latched on the fastening part of the elastic buckle, an L-type female fastener which is provided for a male fastener of the elastic buckle to abut on is formed on a side of the fastening part.

11. The elastic hinge for quick-assembly leg according to claim 1, wherein a non-through crossed inner cavity is set at one end of the leg from outside to inside, and formed by the intersection of a horizontal flat hole and a vertical flat hole, two sides of one of the flat hole are respectively cut through with a small section of up and down side of the leg, a opening is respectively formed on each up and down side of the leg, that is a locking part of the leg, the locking part is specially served for containing two fastening parts of the elastic buckle, two L-type female fasteners which are provided for male fasteners of the elastic buckle to abut on are formed by sides of two openings.

12. The elastic hinge of quick-changed legs according to claim 1, wherein the core pin comprises two cylinders whose head parts are stumpy, the pin parts are slim.

* * * * *